US009002899B2

(12) United States Patent  (10) Patent No.: US 9,002,899 B2
Lambov  (45) Date of Patent: Apr. 7, 2015

(54) METHOD OF MERGING AND INCREMENTAL CONSTRUCTION OF MINIMAL FINITE STATE MACHINES

(75) Inventor: Branimir Z. Lambov, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 12/168,385

(22) Filed: Jul. 7, 2008

(65) Prior Publication Data

US 2010/0005203 A1  Jan. 7, 2010

(51) Int. Cl.
*G06F 17/30* (2006.01)
*G06F 17/50* (2006.01)
*G06F 13/12* (2006.01)
*G06F 17/14* (2006.01)

(52) U.S. Cl.
CPC ............ *G06F 13/124* (2013.01); *G06F 17/148* (2013.01)

(58) Field of Classification Search
CPC ............................ G06F 13/124; G06F 17/148
See application file for complete search history.

(56) References Cited

U.S. PATENT DOCUMENTS

| 5,163,016 | A | | 11/1992 | Har'eL et al. |
| 5,228,040 | A | | 7/1993 | Agrawal et al. |
| 5,394,347 | A | * | 2/1995 | Kita et al. ........................ 703/2 |
| 5,408,597 | A | * | 4/1995 | Kita et al. ...................... 345/440 |
| 5,542,034 | A | * | 7/1996 | Petler ................................ 716/1 |
| 5,555,270 | A | * | 9/1996 | Sun et al. ....................... 714/738 |
| 5,625,554 | A | | 4/1997 | Cutting et al. |
| 5,680,552 | A | | 10/1997 | Netravali et al. |
| 5,721,939 | A | * | 2/1998 | Kaplan ............................. 704/9 |
| 6,108,446 | A | * | 8/2000 | Hoshen .......................... 382/225 |
| 6,144,953 | A | * | 11/2000 | Sorrells et al. .................. 706/60 |
| 6,202,192 | B1 | * | 3/2001 | Donath et al. .................... 716/6 |
| 6,282,694 | B1 | * | 8/2001 | Cheng et al. ..................... 716/10 |
| 6,557,151 | B1 | * | 4/2003 | Donath et al. .................... 716/6 |
| 6,567,962 | B2 | * | 5/2003 | Baumgartner et al. ........... 716/6 |
| 6,587,844 | B1 | * | 7/2003 | Mohri ............................ 706/20 |
| 6,651,096 | B1 | * | 11/2003 | Gai et al. ....................... 709/223 |
| 6,986,114 | B2 | * | 1/2006 | Patzer et al. ...................... 716/5 |
| 7,119,577 | B2 | * | 10/2006 | Sharangpani .................. 326/46 |
| 7,181,386 | B2 | | 2/2007 | Mohri et al. |
| 7,340,473 | B2 | * | 3/2008 | Paruthi et al. ...................... 1/1 |
| 2004/0059443 | A1 | * | 3/2004 | Sharangpani .................. 700/48 |
| 2004/0130620 | A1 | * | 7/2004 | Buehler et al. ................ 348/143 |
| 2004/0215595 | A1 | | 10/2004 | Bax |
| 2005/0265582 | A1 | * | 12/2005 | Buehler et al. ................ 382/103 |
| 2006/0047680 | A1 | * | 3/2006 | Paruthi et al. ................. 707/102 |
| 2007/0299668 | A1 | * | 12/2007 | Allauzen et al. .............. 704/255 |

(Continued)

OTHER PUBLICATIONS

Hyunwoo Cho; Hachtel, G.D.; Macii, E.; Plessier, B.; Somenzi, F.; , "Algorithms for approximate FSM traversal based on state space decomposition," Computer-Aided Design of Integrated Circuits and Systems, IEEE Transactions on , vol. 15, No. 12, pp. 1465-1478, Dec. 1996.*

(Continued)

*Primary Examiner* — Tarek Chbouki (74) *Attorney, Agent, or Firm* — Cantor Colburn LLP; Ryan Lewis (57) ABSTRACT

A method of merging at least two state machines includes: mapping a first node from a first state machine to a second node of a second state machine to generate an input pair; performing a depth-first recursive analysis of transitions and nodes in the first state machine and the second state machine based on the input pair to construct an output node; and mapping the output node to a third state machine.

15 Claims, 6 Drawing Sheets

(56) References Cited

U.S. PATENT DOCUMENTS

| | | | | |
|---|---|---|---|---|
| 2008/0228679 | A1* | 9/2008 | Ward | 706/21 |
| 2008/0275837 | A1* | 11/2008 | Lambov | 706/48 |
| 2009/0063106 | A1* | 3/2009 | Burg et al. | 703/2 |
| 2009/0228502 | A1* | 9/2009 | Lambov | 707/101 |

OTHER PUBLICATIONS

Mao, W. And Milne, G. J. 1992. An Automated Proof Technique for Finite-State Machine Equivalence. In Proceedings of the 3rd international Workshop on Computer Aided Verification (Jul. 1-4, 1991). K. G. Larsen and A. Skou, Eds. Lecture Notes in Computer Science, vol. 575. Springer-Verlag, London, 233-243.*

Devadas, S.; , "Optimizing interacting finite state machines using sequential don't cares," Computer-Aided Design of Integrated Circuits and Systems, IEEE Transactions on , vol. 10, No. 12, pp. 1473-1484, Dec. 1991.*

Devadas, S.; Ma, H.-K.T.; Newton, A.R.; , "On the verification of sequential machines at differing levels of abstraction," Computer-Aided Design of Integrated Circuits and Systems, IEEE Transactions on , vol. 7, No. 6, pp. 713-722, Jun. 1988.*

Clarke, E. M., Emerson, E. A., and Sistla, A. P. 1986. Automatic verification of finite-state concurrent systems using temporal logic specification. ACM Trans. Program. Lang. Syst. 8, 2 (Apr. 1986), 244-263. DOI= http://doi.acm.org/10.1145/5397.5399.*

Tarjan, Robert, "Depth-first search and linear grajh algorithms," Switching and Automata Theory, 1971., 12th Annual Symposium on, vol., No., pp. 114-121, Oct. 13-15, 1971.*

Coudert, O., Berthet, C., and Madre, J. C. 1990. Verification of synchronous sequential machines based on symbolic execution. In Proceedings of the international Workshop on Automatic Verification Methods for Finite State Systems (Grenoble, France). J. Sifakis, Ed. Springer-Verlag New York, New York, NY, 365-373.*

Brayton, R. K., et al. 1996. VIS: A System for Verification and Synthesis. In Proceedings of the 8th international Conference on Computer Aided Verification R. Alur and T. A. Henzinger, Eds. Lecture Notes in Computer Science, vol. 1102. Springer-Verlag, London, 428-432.*

Almeida, J. and Zeitoun, M. 2008. Description and analysis of a bottom-up DFA minimization algorithm. Inf. Process. Lett. 107, 2 (Jul. 2008), 52-59.*

Bruce W. Watson, Jan Daciuk, "An efficient incremental DFA minimization algorithm", Natural Language Engineering 9(1): 49-64 2003.

Jan Daciuk, "Incremental Construction of Finite-State Automata and Transducers, and their Use in the Natureal Language Processing", Ploitechnika Gdanska, Technical University of Gdansk, May 25, 1998 (124 pages).

* cited by examiner

METHOD OF MERGING AND INCREMENTAL CONSTRUCTION OF MINIMAL FINITE STATE MACHINES

BACKGROUND

1. Field

This disclosure relates to methods, systems, and computer program products for merging and constructing finite state machines.

2. Description of Background

Merging two minimal deterministic finite state machines is conventionally accomplished by a two-step process. The first step of the two-step process includes merging the two machines, which creates a non-minimal state machine. The second step of the two-step process includes minimizing the non-minimal state machine.

This two-step process is not always efficient, especially in instances where a large state machine is merged with a small state machine for example, when a dictionary of words or rules is being modified by adding a new rule or word. It would be more efficient to be able to merge two state machines in a single step process.

SUMMARY

The shortcomings of the prior art are overcome and additional advantages are provided through the provision of a method of merging at least two state machines. The method includes: mapping a first node from a first state machine to a second node of a second state machine to generate an input pair; performing a depth-first recursive analysis of transitions and nodes in the first state machine and the second state machine based on the input pair to construct an output node; and mapping the output node to a third state machine.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which merges at least two finite state machines more efficiently.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Figure 1:
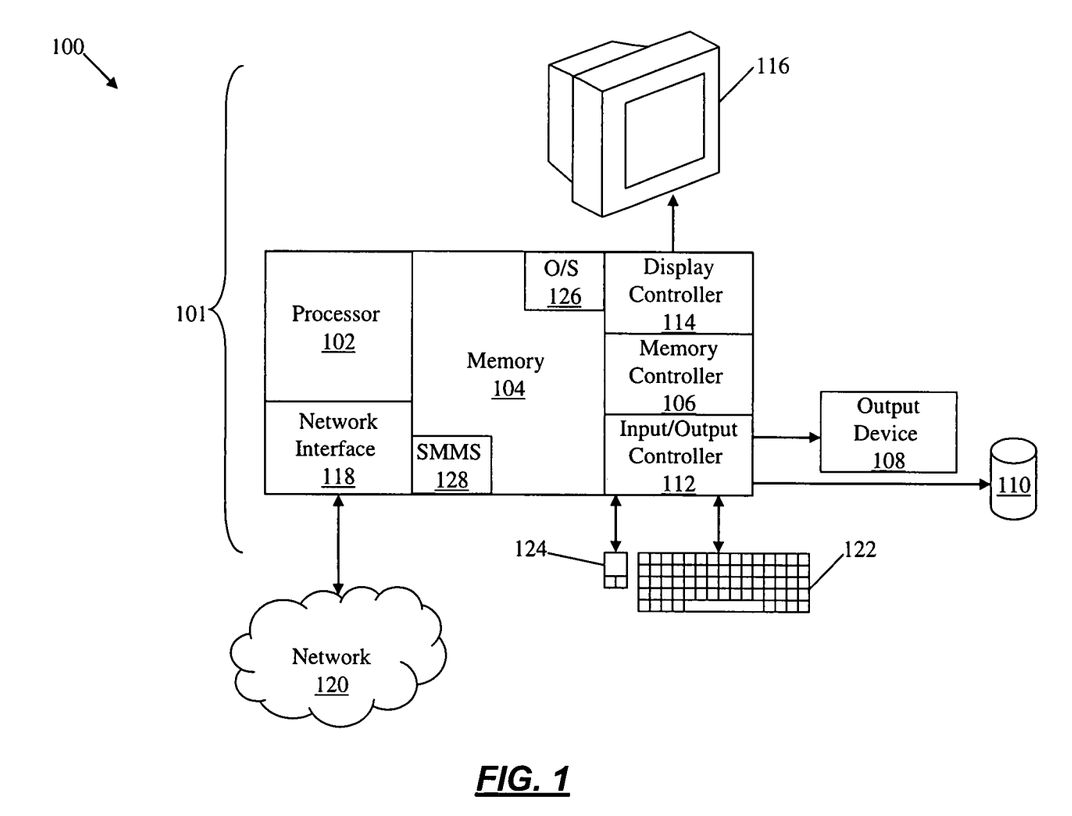
FIG. 1 is an illustration of a computing system that includes a state machine merging system in accordance with an exemplary embodiment.

Turning now to FIG. 1, a block diagram illustrates an exemplary computing system 100 that includes a state machine merging system in accordance with the present disclosure. The computing system 100 is shown to include a computer 101. As can be appreciated, the computing system 100 can include any computing device, including but not limited to, a desktop computer, a laptop, a server, a portable handheld device, or any other electronic device. For ease of the discussion, the disclosure will be discussed in the context of the computer 101.

The computer 101 is shown to include a processor 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, the system 100 can further include a network interface 118 for coupling to a network 120. The network 120 transmits and receives data between the computer 101 and external systems. In an exemplary embodiment, a conventional keyboard 122 and mouse 124 can be coupled to the input/output controller 112.

In various embodiments, the memory 104 stores instructions that can be executed by the processor 102. The instructions stored in memory 104 may include one or more separate programs, each of which comprises an ordered listing of executable instructions for implementing logical functions. In the example of FIG. 1, the instructions stored in the memory 104 include at least a suitable operating system (OS) 126. The operating system 126 essentially controls the execution of other computer programs and provides scheduling, input-output control, file and data management, memory management, and communication control and related services.

When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

In various embodiments, the processor 102 executes the instructions of the state machine merging system 128 of the present disclosure. In various embodiments, the state machine merging system 128 of the present disclosure is stored in the memory 104 (as shown), is executed from a portable storage device (e.g., CD-ROM, Diskette, Flash-Drive, etc.) (not shown), and/or is run from a remote location such as from a central server (not shown).

Figure 2A:
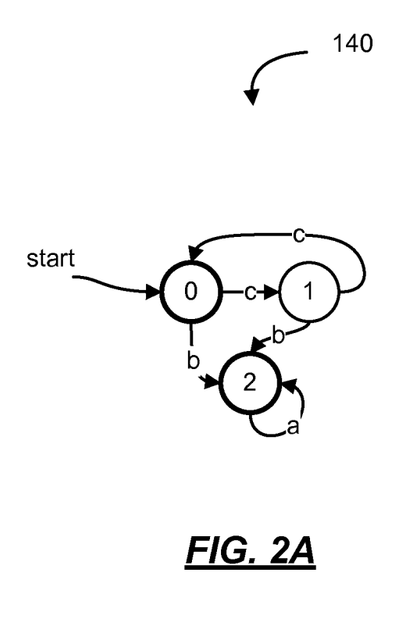
FIGS. 2A-2B are two exemplary state machines that can be processed by the state machine merging system in accordance with an exemplary embodiment.
Figure 2B:
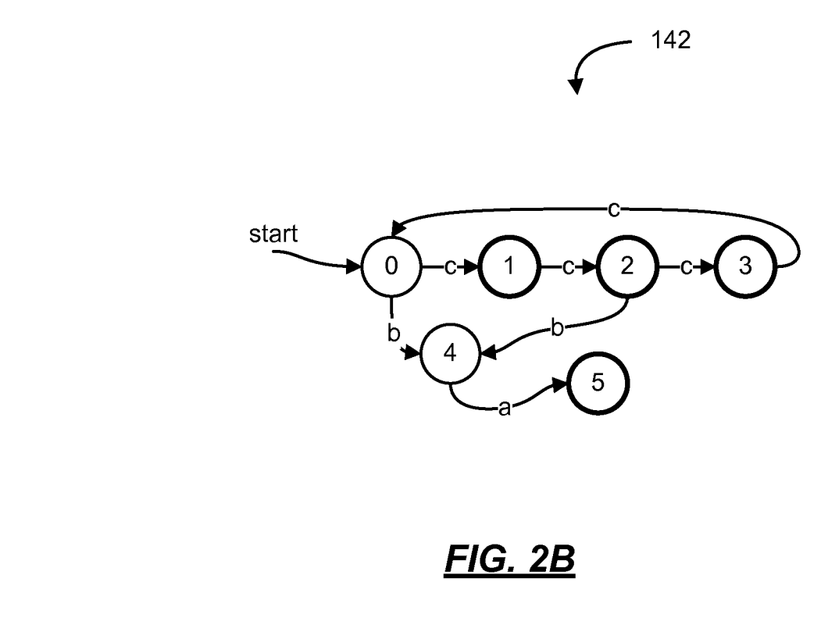

Generally speaking, the state machine merging systems and methods of the present disclosure perform unionization and minimization together in a single step process. In one example, the methods and systems of the present disclosure operate on two or more state machines. As shown in FIG. 2, a first exemplary state machine 140 (hereinafter referred to as the left state machine) and a second exemplary state machine 142 (hereinafter referred to as the right state machine) are behavioral models that can include a plurality of nodes (0-5) and transitions (a-c). Each node (0-5) of the state machines 140, 142 represents or performs an action. The nodes (0-5) are connected by the transitions (a-c). The transitions (a-c) are defined by transition conditions. If the transition conditions are met, the state transitions from one node to the next.

A node can be classified as a "child" node or a "parent" node, where a child node is a node that is transitioned to from a parent node. A node loop can include one or more nodes and transitions that are connected.

In various embodiments, the state machine merging system of FIG. 1 performs a depth-first recursion method on both state machines 140, 142 to identify strongly connected nodes. The sets of strongly connected nodes are treated as "supernodes." The supernodes are used to compile the union of the state machines 140, 142. Like any normal node, each supernode includes a multitude of incoming and outgoing transitions. Like normal nodes, a minimal state machine does not contain supernodes with equivalent internal structure, finality and outgoing transitions.

Figure 3A:
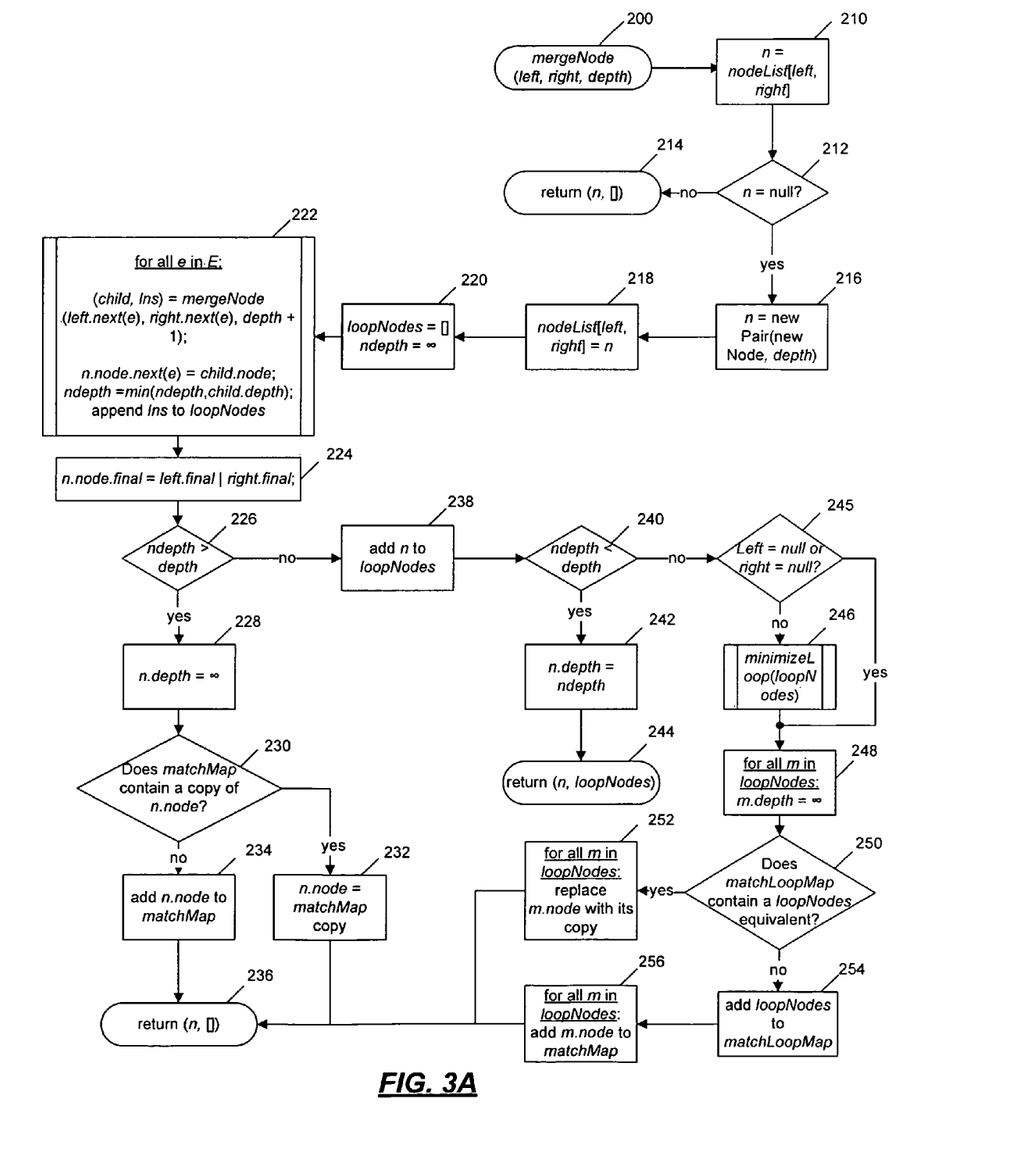
FIGS. 3A-3C are flowcharts illustrating state machine merging methods that can be performed by the state machine merging system of FIG. 1 in accordance with an exemplary embodiment.
Figure 3B:
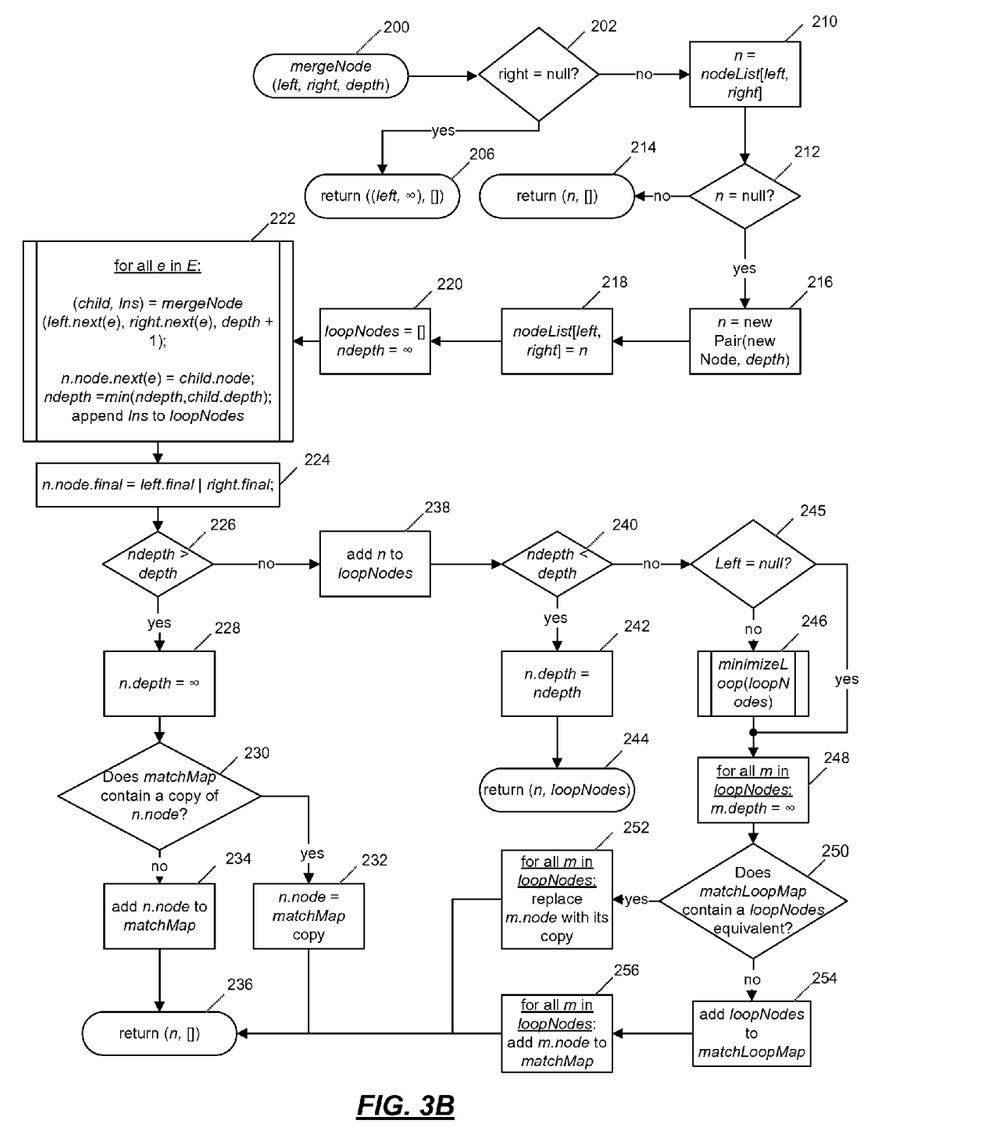

Turning now to FIGS. 3A-3B and with continued reference to FIG. 2, flowcharts illustrate one or more finite state machine merging methods that can be performed by the finite state machine merging system 128 of FIG. 1 in accordance with various aspects of the present disclosure. As can be appreciated in light of the disclosure, the order of operation within the methods is not limited to the sequential execution as illustrated in FIGS. 3A-3B, but may be performed in one or more varying orders as applicable and in accordance with the present disclosure.

In one example, the exemplary methods are depth-first recursive methods that are repeatedly called based on a number of elements (e) in a transition set (E), where the transition set (E) is a union of the transition conditions (a-c) of the left and right state machines 140, 142. The methods construct one or more combination nodes (n) from the single nodes (0-5) of each state machine 140, 142. Each combination node (n) is defined by a node pair (left node, right node) and a node depth (depth). A loop list (LoopNodes) maintains a listing of strongly connected nodes for each combination node (n). This list is minimized and the minimized list is referred to as a supernode of a final merged state machine.

In one example, the exemplary methods utilize internal variables for tracking depth and node values during the recursive processing. The exemplary methods utilize a node list (nodeList) that includes a mapping of node pairs (left node, right node) with a (combination node, depth) pair. The mapping is used to recognize loops (e.g., strongly connected components), to avoid revisiting already processed nodes, and to prevent the method from falling into an infinite loop. Before processing, nodeList[null, null] is initialized to (null, infinity) and all other values of the mapping are set to null. After processing, the nodeList is discarded.

The exemplary methods further maintain a first map (MatchMap) that provides a mapping between equivalence classes of combination nodes (n) and a single member of the class already in the combined state machine. Similarly, a second map (matchLoopMap) includes a mapping between equivalence classes of built supernodes and the corresponding element (e) of the combined state machine.

In one example, the method shown in FIG. 3A can be performed when both input state machines have been minimized. For example, the method begins at the function call to mergeNodes at 200 with a left input node, a right input node, and a current depth as parameters. A first combination node pair (n) is retrieved from the nodesList based on the left input node and right input node (nodeList[left][right]) at block 210. If, at block 212, the combination node (n) is equal to 'null' (e.g., the input pair has not yet been processed), the method proceeds at block 216. Note that each combination node (n) is only processed once. If, at block 212, the combination node (n) is not equal to 'null' (e.g., an output node for the input pair has already been determined and the pair leads to a backward reference to one of the current parents or the input pair has been fully processed), the mergeNodes function returns the combination node (n) and an empty loopNodes list at block 214.

When the combination node (n) is equal to 'null' at block 212, a new combination node (n) is created using the input pair (left node, right node) and the given depth (from block 200) at block 216. The new combination node (n) is then saved to the nodeList at block 218 to indicate that the pair is being processed. At block 220, a loopNodes list is initialized as empty for the new combination node (n) and a new depth value (ndepth) is set to infinity.

Thereafter, the recursion begins at block 222. For each transition(e) in the transition set (E), the mergeNode function is recursively called with an incremented depth. For each recursion, the next node pair according to the current transition element (left.next(e), right.next(e)) is used to determine a child combination node (child) of the present combination node (n). The new depth (ndepth) is determined as a minimum of the new depth (ndepth) and the child depth (child.depth). Thus, through recursion, the minimum of the depths reached by all child nodes is propagated upwards as the depth reached by the parent node. The resulting loop nodes list (lns) is added to the loopNodes list to generate the supernode for that element (e). As will be seen below, the new depth (ndepth) is then used to determine whether a strongly connected component is found.

The finality of the combination node (n) (n.node.final) is set to true based on whether the left node or the right node is a final node at block 224.

At block 226, the new depth (ndepth) is compared with the current depth (depth from block 200). If the new depth (ndepth) is greater than the current depth (depth) at block 226, the combination node is not part of a loop. The combination node depth (ndepth) is set to infinity at block 228 to indicate that the combination node has been processed. The matchMap map is then evaluated at block 230. If the matchMap map contains the equivalence class of the combination node (n) at block 230, the corresponding entry in matchMap map is stored to the node pair (n.node) at block 232. Otherwise, the node pair (n.node) is added to the matchMap at 234. The mergeNodes function returns the combination node (n) and an empty loopNodes list at block 236.

However, if, at block 226, the new depth (ndepth) is less than or equal to the current depth (depth), the combination node (n) is added to the loopNodes list at block 258 and the new depth (ndepth) and the current depth (depth) are evaluated again at block 240.

If the new depth (ndepth) is less than the current depth (depth) at block 240, the combination node (n) is part of the loop, but is not the end of the loop. The combination node depth (n.depth) is set equal to the new depth (ndepth) at block 242. The mergeNodes function returns the combination node (n) and the current loopNodes list at block 244.

If, however, at block 240, the new depth (ndepth) is equal to the current depth (depth), the start of a strongly connected component is found that contains the nodes in the loopNodes list. The loop is minimized at block 246. As can be appreciated, the minimization method of block 246 can be according to any minimization methods known in the art. In various embodiments, the function minimizeLoop is some implementation of automata minimization, which accepts the list of states to be minimized, treats transitions outside of this list as fixed, and updates the references for each node that gets combined with another node.

Thereafter, at blocks 248-256 the matchMap map and the matchLoopMap map are maintained to avoid duplication and thus, achieve minimalism. At block 248, for each combination node (m) in the loopNodes list, the combination node depth (m.depth) is set to infinity. This is done to indicate that the combination nodes of the loopNodes list have been processed.

The matchLoopMap map is then evaluated at block 250. If the matchLoopMap map contains an equivalent of the loopNodes list at block 250, for each combination node m in the loopNodes list, each node m.node is replaced with the copy from the equivalent supernode at block 252. A loopNodes list is equivalent to an element of the matchLoopMap map when there exists a one-to-one mapping of the nodes that makes the two sets of nodes identical. Additionally, the loopNodes list may have an equivalent in the matchLoopMap map by being equivalent to a subset of one if its elements. If, however, the matchLoopMap map does not contain an equivalent of the loopNodes list at block 250, the loopNodes list is added to the matchLoopMap map at block 254 and each combination node m in the loopNodes list is added to the matchMap map at block 256. Thereafter, the mergeNodes function returns the combination node n and an empty loopNodes list at block 236.

In another example, the in-place method shown in FIG. 3B can be used when multiple state machines need to be added to one minimized machine (i.e., when adding rules or words to a dictionary where the changes to the dictionary state machine are minimized, and its minimality is preserved). In this example, the maps are prepared for the existing nodes and supernodes of the minimized state machine, which are to be used by the method. This initialization is performed once as the data is kept up-to-date by the method and left in a state which is ready for its next application. Additionally, if a transition is not present in the machine being added, the processing proceeds as if the nodes are already visited and fully processed, since these nodes are already minimized and will never refer backwards to a node that is created from merging nodes from both graphs. Applying these modifications also ensures that in the case of words (or sorted lists of words) being added to a dictionary, the method does not find a strongly connected component.

As shown in FIG. 3B, the matching process ensures that any repetition of items in the new combination nodes is properly minimized. The merging process creates a new starting node for the combined state machine. The old starting node will have one less reference, which may make the node unreachable, which in turn may lead to other unreachable states. Reference counting, applied to the non-looping nodes and the supernodes of the graph, or garbage collection can be used to remove the unreachable nodes.

In various embodiments, the method can be modified to identify the nodes that only have a single reference and to apply any change to these nodes without copying.

Figure 3C:
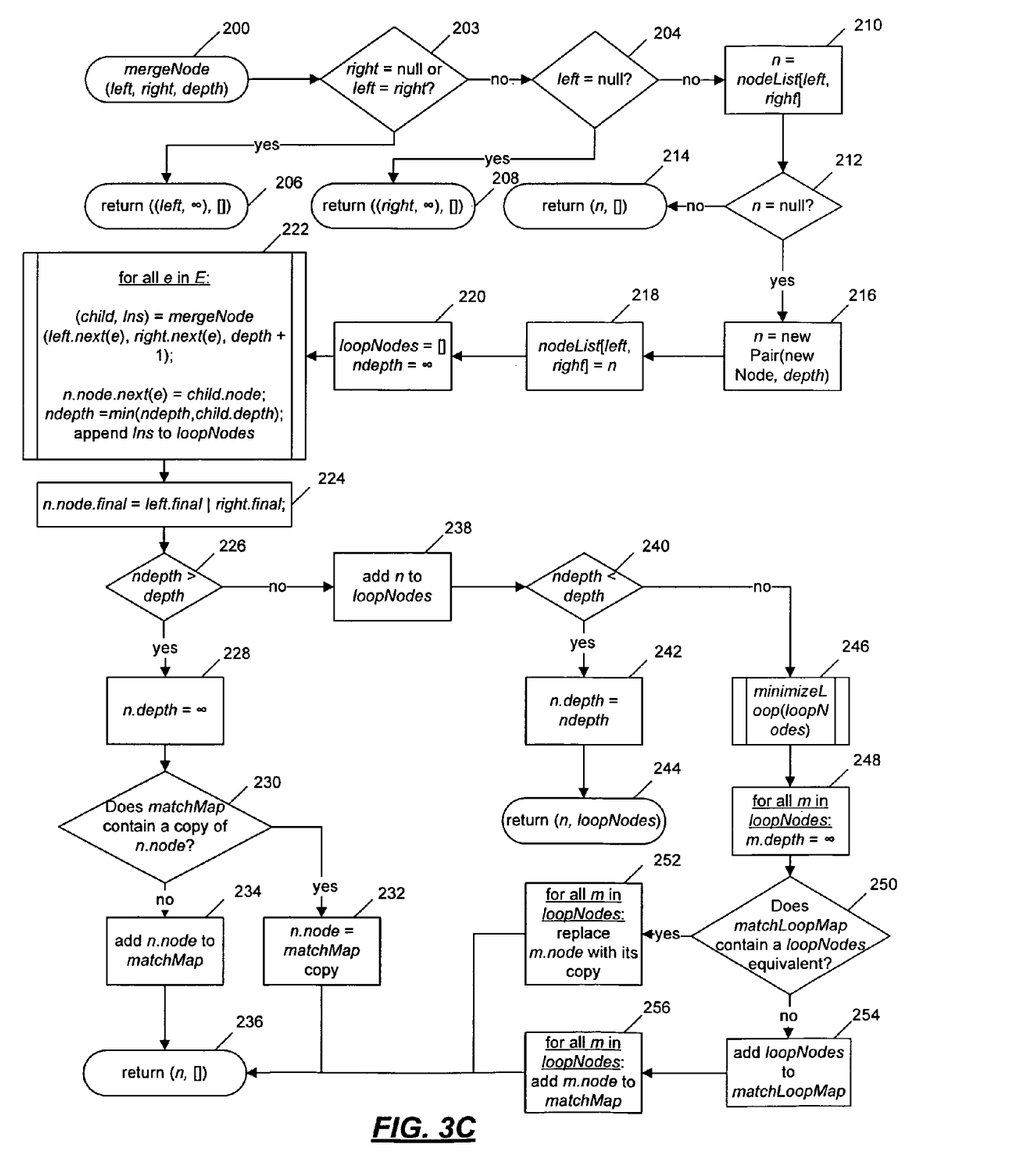
Figure 4A:
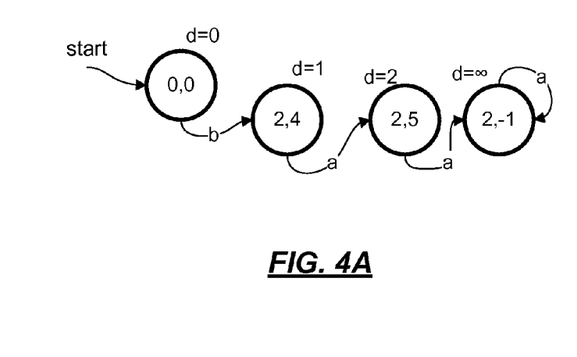
FIGS. 4A-4D are state machines illustrating the merging of the state machines of FIGS. 2A-2B by the state machine merging system and methods in accordance with an exemplary embodiment.
Figure 4B:
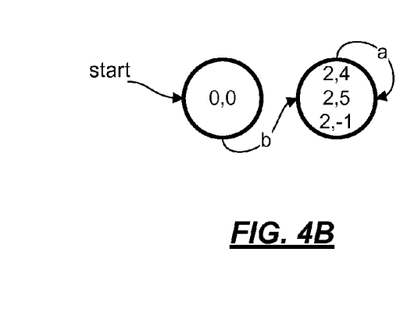
Figure 4C:
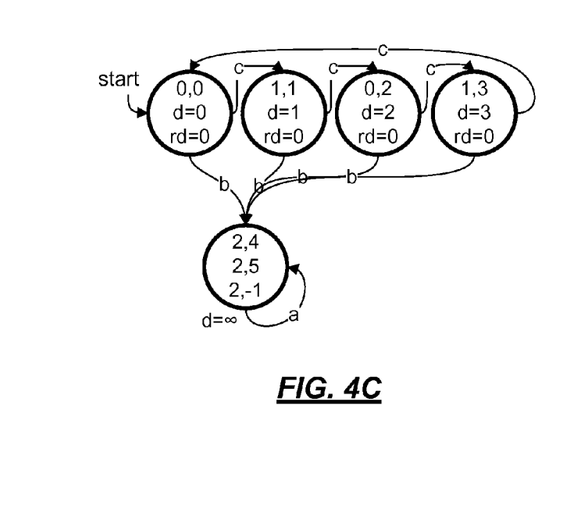
Figure 4D:
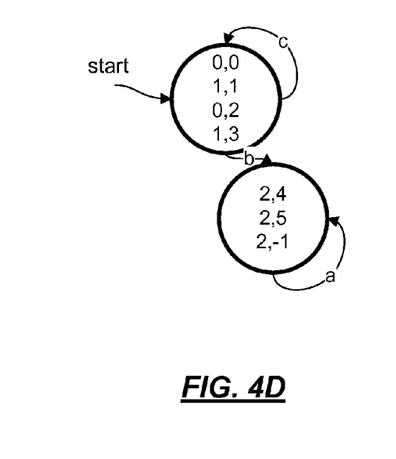

The in-place application can be even further simplified if both source state machines use nodes from the same set, minimized together and indexed by the same maps (e.g. two branches of a state machine). In this case the method shown on FIG. 3C processes only the nodes that are combinations of different nodes from both sources; all other nodes can be treated as already processed. This can be very efficient if a branch needs to be attached to multiple non-empty nodes in an automaton.

In yet another example, removing block 245, "left=null or right=null" in the method of FIG. 3A and connecting blocks 240 and 246 directly allows the method to be applicable to sources that are not minimized, as long as the sources are out of the space of the target automaton. This allows the method to be used as a minimization method, by merging an empty state machine with the input.

Turning to FIGS. 4A-4D and with continued reference to FIGS. 2A-2B, the systems and methods of the present embodiment can be illustrated based on the example state machines of FIGS. 2A and 2B in accordance with an exemplary embodiment. For example, the method begins by processing with the node pair L0 and R0. A temporary combination node (0, 0) is created and assigned a depth "0." According to the first transition "b," the next node pair is L2 and R4. A new combination node (2, 4) is created and assigned a depth "1." According to the second transition "a," the next node pairs are L2 and R5 and L2 and null. A new combination node (2, 5) is created and assigned a depth "2" and a new node (2, −1) is created and assigned a depth "3." The transition "a" is processed, which leads back to the same node and returns a depth of "3".

Since the depth 3 is not greater than the current depth (indicating the recursion level), the combination node (2,−1) is added to the loopNodes list. Since the new depth (ndepth) matches the current depth (recursion level), it is assumed that the combination node is part of a connected component consisting of the nodes in the loopNodes list {(2,−1)}. Since this node does not have a source in the right state machine and the source state machines are minimized, the minimization step of the loop list is not needed. No match for this loop exists in the matchLoopMap map, thus the combination node and loopNodes list as a supernode is added to the matchMap map and the matchLoopMap map respectively. All processing for this combination node is finished, thus the depth is replaced with infinity.

The recursion now backtracks to add the transition a→(2, −1) to the combination node (2, 5) with reached depth infinity. The construction of the combination node (2, 5) is complete, the reached depth is greater than 2, thus the node is not part of a loop. A full copy of the combination node is searched for in the matchMap map (e.g. a final node with a single transition with input 'a' to node (2, −1) is searched. The combination node (2, −1) exactly matches this definition, thus the process continues by discarding the combination node (2, 5), remapping the pair (2, 5) to the combination node (2, −1), and returning a pointer to (2, −1) with depth infinity and empty loopNodes list to the parent.

The processing for the parent combination node (2, 4) proceeds as above, for example, the processing: adds a transition a→(2, −1), with depth infinity; recognizes the node as a non-looping node; finds the combination node (2, −1) as a full copy of the node and remaps the combination node (2, −1); and returns the new pointer with depth infinity and no loop list to the parent.

The transition b→(2, −1) is now added to the combination node (0, 0). The reached depth and loopNodes list remain, respectively, infinity and empty. The recursion now continues to the combination node (1, 1) with depth 1. The transition b from node 1 in the left source leads to the combination node (2, −1), which has already been processed. The returned pointer is then used and the reached depth and loop list are adjusted, which in this case do not change their values of infinity and empty.

The method then proceeds with the transition c to another unprocessed combination node (0, 2). A depth of 2 is assigned, and the transition b is examined. The transition 'b' leads to the combination node (2, 4), which is already processed and mapped to the combination node (2, −1). The transition is created; the reached depth and the loopNodes list do not change.

The method then proceeds with the transition c→(1, 3), with depth 3. Again there is a transition b→(2, −1) which has been processed. Thus, the method continues with the transition 'c,' which leads to the combination node (0, 0), a pair that has already started processing. This results in a reached depth of 0.

All the transitions from the combination node (1, 3) have now been processed. The reached depth is smaller than the recursion depth for this node, thus the combination node is added to the loopNodes list and a pointer to the node is returned, along with recursion depth 0 and {(1, 3)} to the parent. The parent then: creates a link to the combination node (1, 3); adjusts the recursion depth to 0 and adjusts the loopNodes list to {(1, 3)}. Proceeding as above, a pointer to the combination node, with depth 0, and the loopNodes list {(1, 3), (0, 2)} are returned to the parent (1, 1), which in turn finishes its processing and returns a pointer, depth 0 and the list {(1, 3), (0, 2), (1, 1)} to its parent.

This finishes the processing of the transitions coming from the combination node (0, 0). Now the reached depth and recursion depth match, thus after adding the combination node (0, 0) to the loopNodes list the depths identify a strongly connected component. The list {(1, 3), (0, 2), (1, 1), (0, 0)} is now minimized, using the outgoing links as well as the finality information to separate the initial classes. The minimization quickly finishes with all four nodes collapsing to a single node. All four nodes are remapped to (0, 0) and three of them are discarded. The list {(0, 0)} now forms a new supernode. The new supernode cannot be matched to the other supernodes, thus the processing is finalized by adding the new supernode to the matchLoopMap map and the corresponding combination nodes to the matchMap map. The merge is now complete, and the resulting automaton is minimal.

As can be appreciated, the capabilities of the present invention can be implemented in methods, systems, and computer program products that include software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of merging at least two state machines, the method comprising recursively performing a merge function on a processor in order to merge a first state machine and a second state machine into a third state machine, the merge function including steps of:
   receiving a first node of the first state machine, a second node of the second state machine and a depth as inputs;
   initializing a new depth of the third state machine to an infinity and a first list of strongly connected nodes of the third state machine to an empty list;
   for each particular transition of a union of transitions in the first state machine and transitions in the second state machine:
      invoking the merge function with a first child node, a second child node and the input depth incremented by one as inputs, the first child node connected to the first node by the particular transition in the first state machine, the second child node connected to the second node by the particular transition in the second state machine, the recursively invoked function returning a combination node that includes the first and second child nodes and a second list of strongly connected nodes of the third state machine;
      setting the new depth to a lesser of the new depth and a depth of the returned combination node; and
      appending the returned second list of strongly connected nodes to the first list of strongly connected nodes; and
   adding a combination node that includes the first and second nodes to the first list of strongly connected nodes in response to determining that the new depth is less than or equal to the input depth;
   returning the input node pair and the first list of strongly connected nodes in response to determining that the new depth is less than the input depth; and
   returning the input node and an empty list of strongly connected nodes in response to determining that the new depth is equal to the input depth.

2. The method of claim 1, wherein the merge function further includes steps of:
   looking up a list of combination nodes to find a combination node that includes the first and second nodes;
   in response to determining that the list of combination nodes already includes the combination node, returning the combination node and an empty list of strongly connected nodes; and
   in response to determining that the list of combination nodes does not include the combination node, generating a new combination node that includes the first and second nodes and adding the new combination node to the list of combination nodes.

3. The method of claim 1, wherein the merge function further includes steps of:
   maintaining a first map that provides a mapping between equivalence classes of combination nodes and a single member of a class already in the third state machine;

maintaining a second map that includes a mapping between equivalence classes of combination built supernodes and a corresponding transition of the third state machine; and in response to determining that the new depth is greater than the input depth:
setting the new depth to an infinity;
adding the first and second nodes to first map in response to determining that the first map does not include the first and second nodes; and
returning the input node and an empty list of strongly connected nodes.

4. The method of claim 1, wherein the merge function further includes a step of setting a combination node depth to the new depth in response to determining that the new depth is less than the input depth.

5. The method of claim 1, wherein the merge function further includes a step of minimizing the first list of strongly connected nodes in response to determining that the new depth is equal to the input depth and that the first node or the second node is a final node in the first state machine or in the second state machine.

6. A system for merging at least two state machines, the system comprising:
a memory having computer readable instructions; and
a processor configured to execute computer readable instructions comprising recursively performing a merge function in order to merge a first state machine and a second state machine into a third state machine, the merge function including steps of:
receiving a first node of the first state machine, a second node of the second state machine and a depth as inputs;
initializing a new depth of the third state machine to an infinity and a first list of strongly connected nodes of the third state machine to an empty list;
for each particular transition of a union of transitions and nodes in the first state machine and transitions in the second state machine;
invoking the merge function with a first child node, a second child node and the input depth incremented by one as inputs, the first child node connected to the first node by the particular transition in the first state machine, the second child node connected to the second node by the particular transition in the second state machine, the recursively invoked function returning a combination node that includes the first and second child nodes and a second list of strongly connected nodes of the third state machine;
setting the new depth to a lesser of the new depth and a depth of the returned combination node; and
appending the returned second list of strongly connected nodes to the first list of strongly connected nodes; and
adding a combination node that includes the first and second nodes to the first list of strongly connected nodes in response to determining that the new depth is less than or equal to the input depth;
returning the input node pair and the first list of strongly connected nodes in response to determining that the new depth is less than the input depth; and
returning the input node and an empty list of strongly connected nodes in response to determining that the new depth is equal to the input depth.

7. The system of claim 6, wherein the merge function further includes steps of:

looking up a list of combination nodes to find a combination node that includes the first and second nodes;
in response to determining that the list of combination nodes already includes the combination node, returning the combination node and an empty list of strongly connected nodes; and
in response to determining that the list of combination nodes does not include the combination node, generating a new combination node that includes the first and second nodes and adding the new combination node to the list of combination nodes.

8. The system of claim 6, wherein the merge function further includes steps of:
maintaining a first map that provides a mapping between equivalence classes of combination nodes and a single member of a class already in the third state machine;
maintaining a second map that includes a mapping between equivalence classes of combination built supernodes and a corresponding transition of the third state machine; and
in response to determining that the new depth is greater than the input depth:
setting the new depth to an infinity;
adding the first and second nodes to first map in response to determining that the first map does not include the first and second nodes; and
returning the input node and an empty list of strongly connected nodes.

9. The system of claim 6, wherein the merge function further includes a step of setting a combination node depth to the new depth in response to determining that the new depth is less than the input depth.

10. The system of claim 6, wherein the merge function further includes a step of minimizing the first list of strongly connected nodes in response to determining that the new depth is equal to the input depth and that the first node or the second node is a final node in the first state machine or in the second state machine.

11. A computer program product for merging at least two finite state machines, the computer program product comprising:
a non-transitory computer-readable storage medium that stores computer-readable instructions, that, when executed, implement a method for merging two finite state machines, the method for merging the two finite state machines comprising recursively performing a merge function on a processor in order to merge a first state machine and a second state machine into a third state machine, the merge function including steps of:
receiving a first node of the first state machine, a second node of the second state machine and a depth as inputs;
initializing a new depth of the third state machine to an infinity and a first list of strongly connected nodes of the third state machine to an empty list;
for each particular transition of a union of transitions in the first state machine and transitions in the second state machine;
invoking the merge function with a first child node, a second child node and the input depth incremented by one as inputs, the first child node connected to the first node by the particular transition in the first state machine, the second child node connected to the second node by the particular transition in the second state machine, the recursively invoked function returning a combination node that includes the first and second child nodes and a second list of strongly connected nodes of the third state machine;

setting the new depth to a lesser of the new depth and a depth of the returned combination node; and appending the returned second list of strongly connected nodes to the first list of strongly connected nodes; and adding a combination node that includes the first and second nodes to the first list of strongly connected nodes in response to determining that the new depth is less than or equal to the input depth;

returning the input node pair and the first list of strongly connected nodes in response to determining that the new depth is less than the input depth; and returning the input node and an empty list of strongly connected nodes in response to determining that the new depth is equal to the input depth.

12. The computer program product of claim 11, wherein the merge function further includes steps of:

looking up a list of combination nodes to find a combination node that includes the first and second nodes;

in response to determining that the list of combination nodes already includes the combination node, returning the combination node and an empty list of strongly connected nodes; and in response to determining that the list of combination nodes does not include the combination node, generating a new combination node that includes the first and second nodes and adding the new combination node to the list of combination nodes.

13. The computer program product of claim 11, wherein the merge function further includes steps of:

maintaining a first map that provides a mapping between equivalence classes of combination nodes and a single member of a class already in the third state machine;

maintaining a second map that includes a mapping between equivalence classes of combination built supernodes and a corresponding transition of the third state machine; and in response to determining that the new depth is greater than the input depth:

setting the new depth to an infinity;

adding the first and second nodes to first map in response to determining that the first map does not include the first and second nodes; and returning the input node and an empty list of strongly connected nodes.

14. The computer program product of claim 11, wherein the merge function further includes a step of setting a combination node depth to the new depth in response to determining that the new depth is less than the input depth.

15. The computer program product of claim 11, wherein the merge function further includes a step of minimizing the first list of strongly connected nodes in response to determining that the new depth is equal to the input depth and that the first node or the second node is a final node in the first state machine or in the second state machine.

* * * * *